United States Patent [19]

Ohkura

[11] 4,208,102
[45] Jun. 17, 1980

[54] ENLARGEMENT LENS MOUNT

[75] Inventor: Zenichi Ohkura, Omiya, Japan

[73] Assignee: Asahi Kogaku Kogyo Kabushiki Kaisha, Tokyo, Japan

[21] Appl. No.: 941,713

[22] Filed: Sep. 12, 1978

[30] Foreign Application Priority Data

Sep. 16, 1977 [JP] Japan .................. 52-124686[U]

[51] Int. Cl.² ............................................. G02B 7/02
[52] U.S. Cl. ................................. 350/252; 350/266;
353/100; 354/289; 362/26
[58] Field of Search ............... 350/110, 252, 257, 266,
350/273; 353/97, 100, 101; 354/273, 286, 289;
355/67, 71; 362/23, 26

[56] References Cited
U.S. PATENT DOCUMENTS

| 2,504,254 | 4/1950 | De Grave, Jr. .................. 362/26 |
| 3,185,064 | 5/1965 | Armbruster et al. ............ 354/289 X |

FOREIGN PATENT DOCUMENTS

| 1035464 | 7/1958 | Fed. Rep. of Germany .......... 354/289 |
| 1056921 | 5/1959 | Fed. Rep. of Germany .......... 354/273 |

Primary Examiner—F. L. Evans
Attorney, Agent, or Firm—Sughrue, Rothwell, Mion, Zinn and Macpeak

[57] ABSTRACT

An enlargement system has a light guide mounted inside the lens mount to reflect light from inside the enlarger on to a stop-value scale. A light shut-off ring is positioned relative to the light guide to selectively allow or cut-off the passage of light. In a first position a cut away portion allows light from inside the enlarger to pass through the light guide and illuminate the scale. When the system is used for close-up photography, the shut-off ring is rotated to prevent light that enters through the scale into the light guide from propagating into the enlarger.

10 Claims, 6 Drawing Figures

U.S. Patent    Jun. 17, 1980    4,208,102

ENLARGEMENT LENS MOUNT

BACKGROUND OF THE INVENTION

An enlargement lens is used for printing a film image onto a photographic paper by having a magnifying power of 1 or more with enlargement lens mounted on an enlarger. The enlargement lens is used in a dark room for preventing the photographic paper from sensing unnecessary light. Although "safe" lights may be used, the light level is still very low. Therefore, it is difficult to read the stop value scale on the enlarger. This is a requirement such that a suitable stop-value can be determined since it is a condition to be ascertained for having a proper exposure. In view of this need, in the prior art provisions have been made to configure an enlargement lens having a light guide in order to enable stop-value scale illumination by use of the light source in the enlarger. This leads to shortening the operational time in the dark room without extra work and fatigue.

Since, an enlargement lens, generally has a standard magnification in a range of 5× to 10×, the enlargement lens is used not only for the enlargement function but for close-up photography and copying.

However, when a conventional enlargement lens having a light guide for reflecting light inside a lens mount for stop-value scale illumination is used for close-up photography or copying it is possible that light outside the lens mount is sensed on film through the light guide during the actual photographing process. Such an enlargement lens is therefore not practical for multipurpose use and is used only for enlargement.

SUMMARY OF THE INVENTION

In view of the above-described defect, an object of the present invention is to provide a novel enlargement lens enabling stop-value scale illumination and selective shut-off of light to a light guide by a change-over operation to thereby provide a wider range of utilization for the enlargement lens.

It is another object of this invention to provide for an enlarging system that provides flexibility of operation without degrading enlarger performance.

These and other objects of this invention are accomplished by placing a shut-off ring relative to the light guide to allow for selective transmission of light. The shut-off ring has two operative positions, a first where a cut away portion allows transmission of light through the light guide to illuminate a stop-value scale and a second where the transmission of light into the enlarger system is prevented. The shut-off ring is elastically deformable to allow for a light tight fit in the lens mount yet be rotatable between the two operative positions.

The invention will be described in detail referring to the accompanying drawings and the description of the preferred embodiment that follows.

DESCRIPTION OF THE PREFERRED EMBODIMENT

Figure 1:
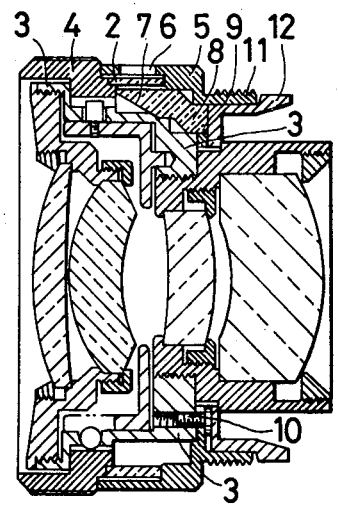
FIG. 1 shows a cross-section of an enlargement lens of the present invention.
Figure 2:
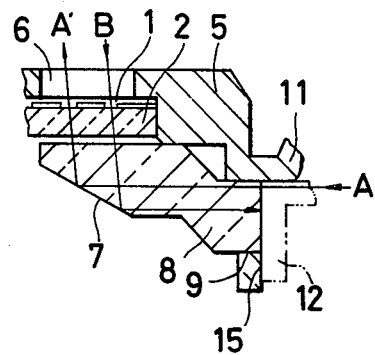
FIG. 2 shows an enlarged view of a light guide shown in FIG. 1.

Referring now to FIGS. 1 and 2 the preferred embodiment of this invention will be described.

A stop value scale ring 2 is made of a transparent synthetic resin and has on the periphery stop-values 1 printed. The ring is fixed to a stop-value operation ring 4 provided on a lens mount 3 that holds the lens frames and a stop-value opening and closing member.

A mounting window 9 for the light guide 8 is formed inside the lens mount rings. The mount ring 5 also has a stop-value reading window 6 formed in the upper surface immediately above the scale ring 2. The light guide 8 has a reflex surface 7 that bears on the mount 3 and is supported thereon. As shown in FIG. 1 the ring 5 is integrally secured with the lens mount 3 by a pin 10.

Figure 3:
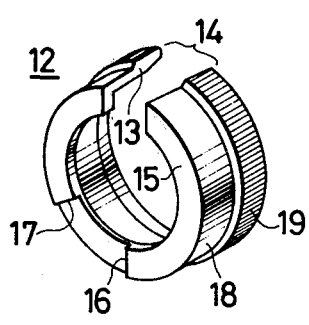
FIG. 3 shows a perspective view of a light shut-off ring.

A light shut-off ring 12 includes a light passing cut-away portion 14 (FIG. 3) having beveled surfaces 13 on which light is readily reflected. A light shut-off surface 15 is provided on the ring 12 and rotation limiting shouldered portions 16 and 17 are shown in FIG. 3. The light shut-off ring 12 also has an engaging surface 18, the outer diameter of which is slightly larger than an innermost diameter of the lens mount ring 5. A rotation operational surface 19 has a serrated finish thereon and the ring 12 is rotatably inserted into the lens mount ring 5.

Figure 5:
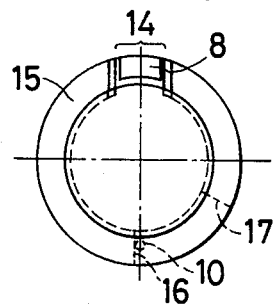
FIGS. 5 and 6 show the mounting state of a shut-off ring as viewed from the rear of the lens mount, FIG. 5 allowing light transmission and FIG. 6 preventing light transmission.

In this configuration, when the enlargement lens is used for enlargement of a picture, the light passing cut-away portion 14 is maintained at the position corresponding to the light guide 8 by the contact between the pin 10 and the rotation limiting shouldered portion 16 as shown in FIG. 5. The light shut-off ring 12 is supported by the frictional force between the inner surface of the lens mount ring 5 and the engaging surface 18 without rotational displacement.

Figure 4:
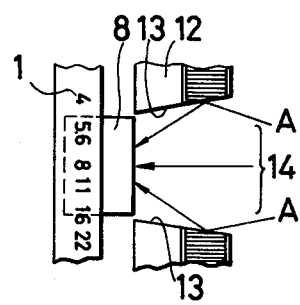
FIG. 4 shows a schematic top view of a stop-value scale, a light guide and a light shut-off ring.

Light A, from the enlarger, shown in FIGS. 2 and 4 is projected through a light passing cut-away portion 14 into a light guide 8. The light reflects off the surface 7 and illuminates the scale 1 as a light A'.

Figure 6:
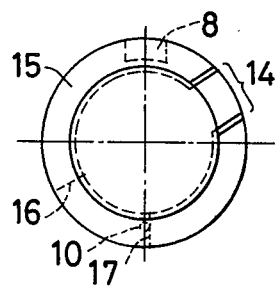

When the enlargement lens is used for close-up photographing or copying, the light shut-off ring 12 is elastically deformed by gripping the rotation operational surface 19 to thereby degrade the frictional force between the inner surface of the lens mount ring 5 and the engaging surface 18 of the shut off ring 12. Then, the shut-off ring 12 can be easily rotated until the other shouldered portion 17 is in contact with the pin 10 as shown in FIG. 6. In this situation, even if light B shown in FIG. 2 passes through the scale 1 and the light guide 8, that source, light B is completely shut off by the shut-off surface 15.

Accordingly, the enlargement lens system of this invention enables the user to have stop-value illumination for enlargement work but also for close-up photograph and copying by merely using change-over mode of operation as described.

It is apparent those modifications and variations of this invention may be made without departing from the essential scope thereof.

I claim:

1. In an enlargement lens system having a lens mount, a light guide disposed in said mount and a stop value scale wherein light inside said lens mount is reflected by said light guide to illuminate said scale, the improvement comprising, a light shut-off ring mounted in the path of light passing through said light guide, said shut-off ring having a cut away portion corresponding to the light transmission portion of said light guide, wherein said ring is rotatable with respect to said lens mount to prevent propagation of light from said scale and passing through said light guide into said enlargement lens system.

2. The system of claim 1 further comprising a first rotation limiting shoulder portion on said shut-off ring and means for limiting motion of said shoulder portion whereby said ring is positioned relative to said light guide to align said cut-away portion with said light guide.

3. The system of claim 2 further comprising a second rotation limiting shoulder portion on said shut-off ring wherein said means for limiting motion of said shoulder portion is engageable with said second shoulder portion to position said ring to prevent the passage of light therethrough.

4. The system of claim 3 further comprising, an engaging surface on said ring for frictionally contacting an inner surface of said lens mount and wherein the outer diameter of said engaging surface is slightly larger than the inner diameter of said lens mount.

5. The system of claim 4 wherein said ring is elastically deformable, said ring further comprising means to grip said ring.

6. The system of claim 1 wherein said cut away portion is defined by a pair of light reflecting beveled surfaces.

7. The system of claim 6 further comprising, an engaging surface on said ring for frictionally contacting an inner surface of said lens mount and wherein said beveled surfaces extend through said engaging surface.

8. The system of claim 7 wherein said ring is elastically deformable, said ring further comprising means to grip said ring and wherein said beveled surfaces extend through said means to grip.

9. The system of claim 8 wherein said ring further comprises first and second shoulder portions and, means selectively engageable with said shoulder portions for limiting movement of said ring.

10. The system of claim 9 wherein said means for limiting movement is engageable with one of said shoulder portions to align said cut away portion with said light guide.

* * * * *